(12) United States Patent
Pals et al.

(10) Patent No.: US 11,394,433 B2
(45) Date of Patent: Jul. 19, 2022

(54) FULL DIMENSION MULTIPLE-INPUT MULTIPLE-OUTPUT BASEBAND CAPABILITY INDICATION

(71) Applicant: QUALCOMM Incorporated, San Diego, CA (US)

(72) Inventors: Timothy Paul Pals, San Diego, CA (US); Alberto Rico Alvarino, San Diego, CA (US); Amir Farajidana, Sunnyvale, CA (US); Honey Kakkar, San Diego, CA (US); Parastoo Kheirkhah, San Diego, CA (US); Nitin Pant, San Diego, CA (US); Umesh Phuyal, San Diego, CA (US); Wenshu Zhang, San Diego, CA (US); Manish Jain, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 123 days.

(21) Appl. No.: 16/820,354

(22) Filed: Mar. 16, 2020

(65) Prior Publication Data
US 2020/0313731 A1    Oct. 1, 2020

Related U.S. Application Data

(60) Provisional application No. 62/825,797, filed on Mar. 28, 2019.

(51) Int. Cl.
*H04B 7/04*    (2017.01)
*H04B 7/0417*    (2017.01)
(Continued)

(52) U.S. Cl.
CPC ......... *H04B 7/0417* (2013.01); *H04B 7/0452* (2013.01); *H04B 7/0617* (2013.01); *H04W 8/24* (2013.01)

(58) Field of Classification Search
CPC .... H04B 7/088; H04B 7/0413; H04B 7/0617; H04B 7/0695; H04B 7/024; H04B 7/0408;
(Continued)

(56) References Cited

U.S. PATENT DOCUMENTS

2014/0204848 A1*  7/2014  Geirhofer ............... H04W 8/24
                                                    370/329
2016/0374069 A1*  12/2016  Palm ..................... H04L 5/0098
(Continued)

OTHER PUBLICATIONS

International Search Report and Written Opinion—PCT/US2020/023192—ISA/EPO—dated May 15, 2020.

*Primary Examiner* — Fred A Casca
(74) *Attorney, Agent, or Firm* — Patterson & Sheridan, L.L.P.

(57) ABSTRACT

Certain aspects of the present disclosure provide techniques for reducing a quantity of data sent carrier aggregation (CA) related capability reporting by a UE operating in a cell using full dimension multiple-input multiple-output (FD-MIMO) techniques. In an exemplary method, a base station obtains a relative weight of baseband processing for a component carrier (CC) configured for full-dimension multiple-input multiple-output (FD-MIMO) communications for a user equipment (UE); determines, based on the relative weight, to enable FD-MIMO downlink (DL) transmissions to the UE via the CC; and transmits an FD-MIMO transmission via the CC to the UE.

30 Claims, 6 Drawing Sheets

(51) Int. Cl.
*H04B 7/06* (2006.01)
*H04W 8/24* (2009.01)
*H04B 7/0452* (2017.01)

(58) Field of Classification Search
CPC .. H04B 7/0486; H04B 7/0626; H04B 7/0452; H04B 17/309; H04B 17/318; H04B 7/04; H04B 7/0417; H04B 7/0619; H04B 7/0404; H04B 1/1027; H04W 88/085; H04L 5/0057; H04L 5/006; H04L 25/0202; H04L 25/0248; H04L 1/1854
See application file for complete search history.

(56) References Cited

U.S. PATENT DOCUMENTS

2018/0007574 A1\* 1/2018 Park .................... H04B 7/04
2018/0198502 A1 7/2018 Kim et al.

\* cited by examiner

FULL DIMENSION MULTIPLE-INPUT MULTIPLE-OUTPUT BASEBAND CAPABILITY INDICATION

CROSS-REFERENCE TO RELATED APPLICATIONS

The present Application for Patent claims benefit of and priority to U.S. Provisional Patent Application Ser. No. 62/825,797, filed Mar. 28, 2019, which is assigned to the assignee hereof and hereby expressly incorporated by reference herein in its entirety as if fully set forth below and for all applicable purposes.

BACKGROUND

Field of the Disclosure

Aspects of the present disclosure relate to wireless communications, and more particularly, to techniques for reporting carrier aggregation (CA) capabilities in a full dimension multiple-input multiple-output (FD-MIMO) wireless communication system.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, next generation NodeB (gNB or gNodeB), TRP, etc.). A BS or DU may communicate with a set of UEs on downlink channels (e.g., for transmissions from a BS or DU to a UE) and uplink channels (e.g., for transmissions from a UE to a BS or DU).

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between base stations (BSs) and user equipments (UEs) in a wireless network.

Certain aspects provide a method for wireless communications performed by a base station (BS). The method generally includes the BS obtaining a relative weight of baseband processing for a component carrier (CC) configured for full-dimension multiple-input multiple-output (FD-MIMO) communications for a user equipment (UE); determining, based on the relative weight, to enable FD-MIMO downlink (DL) transmissions to the UE via the CC; and transmitting an FD-MIMO DL transmission via the CC to the UE.

Certain aspects provide a method for wireless communications performed by a user equipment (UE). The method generally includes the UE providing a relative weight of baseband processing for full-dimension multiple-input multiple-output (FD-MIMO) communications from a base station (BS); and receiving, from the BS, an FD-MIMO transmission having a number of spatial layers determined based on the relative weight.

Certain aspects provide an apparatus for wireless communications. The apparatus generally includes a processor configured to: obtain a relative weight of baseband processing for a component carrier (CC) configured for full-dimension multiple-input multiple-output (FD-MIMO) communications for a user equipment (UE); determine, based on the relative weight, to enable FD-MIMO downlink (DL) transmissions to the UE via the CC; and transmit an FD-MIMO DL transmission via the CC to the UE; and a memory coupled with the processor.

Certain aspects provide an apparatus for wireless communications. The apparatus generally includes processor configured to: provide a relative weight of baseband processing for full-dimension multiple-input multiple-output (FD-MIMO) communications from a base station (BS); and receive, from the BS, an FD-MIMO transmission having a number of spatial layers determined based on the relative weight; and a memory coupled with the processor.

Certain aspects provide an apparatus for wireless communications. The apparatus generally includes means for obtaining a relative weight of baseband processing for a component carrier (CC) configured for full-dimension multiple-input multiple-output (FD-MIMO) communications for a user equipment (UE); means for determining, based on the relative weight, to enable FD-MIMO downlink (DL) transmissions to the UE via the CC; and means for transmitting an FD-MIMO transmission via the CC to the UE.

Certain aspects provide an apparatus for wireless communications. The apparatus generally includes means for providing a relative weight of baseband processing for full-dimension multiple-input multiple-output (FD-MIMO) communications from a base station (BS); and means for receiving, from the BS, an FD-MIMO transmission having a number of spatial layers determined based on the relative weight.

Certain aspects provide computer-readable medium for wireless communications. The computer-readable medium includes instructions that, when executed by a processing system, cause the processing system to perform operations generally including obtaining a relative weight of baseband processing for a component carrier (CC) configured for full-dimension multiple-input multiple-output (FD-MIMO) communications for a user equipment (UE); determining, based on the relative weight, to enable FD-MIMO downlink (DL) transmissions to the UE via the CC; and transmitting an FD-MIMO transmission via the CC to the UE.

Certain aspects provide computer-readable medium for wireless communications. The computer-readable medium includes instructions that, when executed by a processing system, cause the processing system to perform operations generally including providing a relative weight of baseband processing for full-dimension multiple-input multiple-output (FD-MIMO) communications from a base station (BS); and receiving, from the BS, an FD-MIMO transmission having a number of spatial layers determined based on the relative weight.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
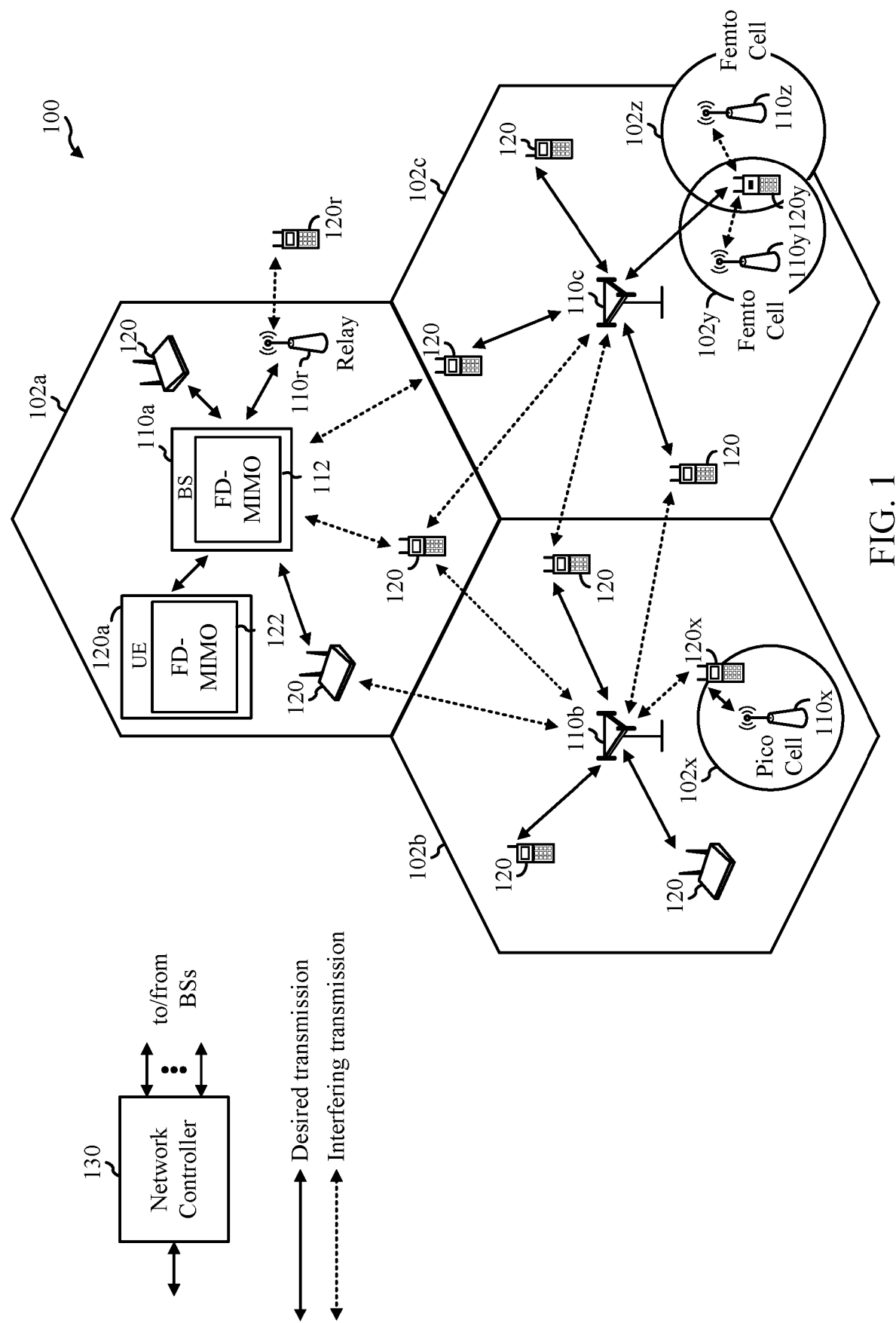
FIG. 1 is a block diagram conceptually illustrating an example telecommunications system, in accordance with certain aspects of the present disclosure.

Aspects of the present disclosure provide apparatus, methods, processing systems, and computer readable mediums to reduce a quantity of data sent in carrier aggregation (CA) related capability reporting by a UE operating in a cell using full dimension multiple-input multiple-output (FD-MIMO) techniques. In particular, to accurately signal modem capability according to previously known techniques (e.g., LTE Rel-13), the same band combination may be indicated multiple times in a capabilities report (i.e., from a UE) with a different distribution of MIMO capabilities for each band, where the distribution of MIMO capabilities is constrained to satisfy baseband processing limits of the modem of the UE. According to aspects of the present disclosure, a UE may provide such modem baseband processing limits in a capability signaled (e.g., to a serving BS) separately from CA capability. In aspects of the present disclosure, a BS may obtain an indication of modem baseband capability limits from a UE; determine, based on the limits, to enable FD-MIMO downlink transmissions to the UE via a component carrier (CC); and transmit an FD-MIMO transmission via the CC to the UE.

As used herein, full dimension multiple-input multiple-output (FD-MIMO) techniques refers to the usage of multiple antennas for beamforming in both vertical and horizontal directions. That is, a communication system using FD-MIMO techniques uses a plurality of antennas (e.g., an array of antennas) to form transmit and/or receive beams than can be focused (e.g., aimed) horizontally and vertically. The plurality of antennas may be arranged, for example, in a two-dimensional (e.g., rectangular) array. Beamforming in a vertical plane may be referred to as elevation beamforming, and beamforming in a horizontal plane may be referred to as azimuth beamforming.

According to previously known techniques, a UE may be operating in a cell that uses the band combination 1C(4-4)-3C(4-4), where the number of layers of DL MIMO spatial multiplexing for each CC is indicated in parentheses. If this configuration already consumes all modem baseband processing resources available to the UE, then the UE may not signal FD-MIMO capability for any bands in this band combination, since FD-MIMO modem processing incurs additional costs. The UE may however report FD-MIMO capability if the UE downgrades the DL MIMO capability to support fewer layers of spatial multiplexing, allowing processing resources to be directed to FD-MIMO rather than higher-rank spatial multiplexing. In this example, the UE may report the following band combinations, where FD-MIMO capability for a band is indicated in parentheses:

Downgrade 1C: 1C(2-2-FD)-3C(4-4)
Downgrade 3C: 1C(4-4)-3C(2-2-FD)
Downgrade 1C and 3C: 1C(2-2-FD)-3C(2-2-FD)

It may be noted that none of the band combinations listed above are "fallback band combinations" (as described in previously known techniques), because the band combinations are not derived from 1C(4-4)-3C(4-4) by releasing a secondary cell (SCell) or uplink configuration of an SCell, so different fallback reporting does not reduce the reporting burden.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably.

A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3 GPP2).

New Radio (NR) is an emerging wireless communications technology under development in conjunction with the 5G Technology Forum (5GTF). NR access (e.g., 5G NR) may support various wireless communication services, such as enhanced mobile broadband (eMBB) services targeting wide bandwidth (e.g., 80 MHz or wider) communications, millimeter wave (mmW) services targeting high carrier frequency (e.g., 25 GHz or higher) communications, massive machine type communications (mMTC) services targeting non-backward compatible machine type communications (MTC) techniques, and/or mission critical services targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

FIG. 1 illustrates an example wireless communication network 100 in which aspects of the present disclosure may be performed. For example, the wireless communication network 100 may be an NR system (e.g., a 5G NR network). For example, as shown in FIG. 1, the UE 120a has a transceiver that may be configured to provide (e.g., transmit in a capabilities message) a relative weight of baseband processing for FD-MIMO communications from the base station 110a, according to aspects described herein. In another example, as shown in FIG. 1, the BS 110a has a controller/processor module that may be configured to obtain (e.g., from a capabilities received by a receiver of the BS) a relative weight of baseband processing for a component carrier (CC) configured for full-dimension multiple-input multiple-output (FD-MIMO) communications for the UE, to determine, based on the relative weight, to enable FD-MIMO downlink (DL) transmissions to the UE via the CC, and to transmit an FD-MIMO transmission via the CC to the UE, according to aspects described herein.

As illustrated in FIG. 1, the wireless communication network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. In some examples, a cell may not necessarily be stationary, and the geographic area of the cell may move according to the location of a mobile BS. In some examples, the BSs may be interconnected to one another and/or to one or more other BSs or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

NR may utilize OFDM with a CP on the uplink and downlink and include support for half-duplex operation using TDD. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

In FIG. 1, a solid line with double arrows indicates desired transmissions between a UE and a serving BS, which is a BS designated to serve the UE on the downlink and/or uplink. A finely dashed line with double arrows indicates potentially interfering transmissions between a UE and a BS.

According to certain aspects, the BSs 110 and UEs 120 may be configured to enable reporting carrier aggregation (CA) capabilities in a full dimension multiple-input multiple-output (FD-MIMO) wireless communication system and transmit according to those CA capabilities. As shown in FIG. 1, the BS 110a includes an FD-MIMO manager 112. The FD-MIMO manager 112 may be configured to obtain a relative weight of baseband processing for a component carrier (CC) configured for full-dimension multiple-input multiple-output (FD-MIMO) communications for a user equipment (UE); to determine, based on the relative weight, to enable FD-MIMO downlink (DL) transmissions to the UE via the CC; and to transmit an FD-MIMO DL transmission via the CC to the UE, in accordance with aspects of the present disclosure. As shown in FIG. 1, the UE 120a includes an FD-MIMO manager 122. The FD-MIMO manager 122 may be configured to provide a relative weight of baseband processing for full-dimension multiple-input multiple-output (FD-MIMO) communications from a base station (BS); and to receive, from the BS, an FD-MIMO transmission having a number of spatial layers determined based on the relative weight, in accordance with aspects of the present disclosure.

Figure 2:
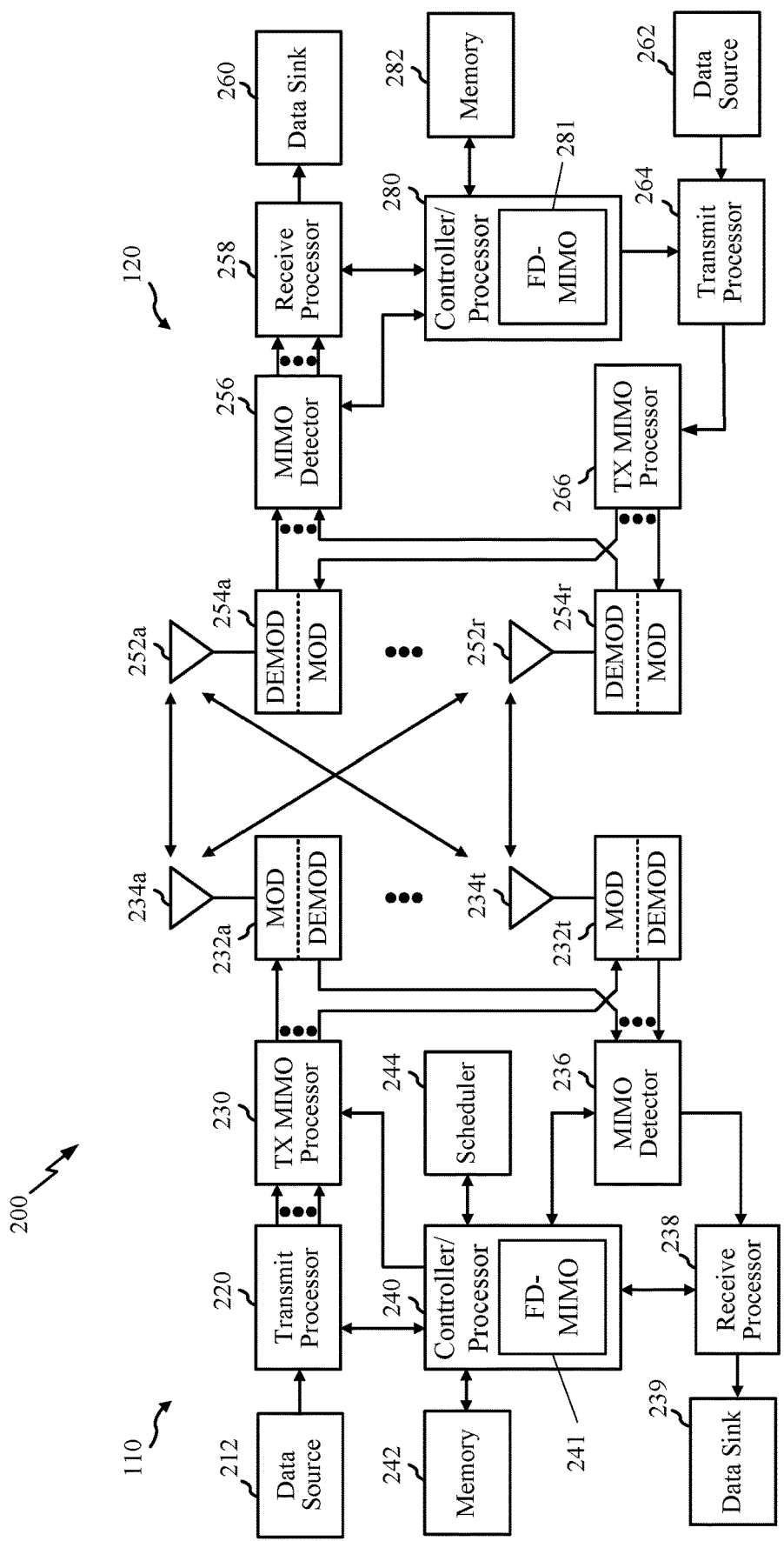
FIG. 2 is a block diagram illustrating an example architecture of a distributed radio access network (RAN), in accordance with certain aspects of the present disclosure.

FIG. 2 illustrates example components of BS 110 and UE 120 (e.g., in the wireless communication network 100 of FIG. 1), which may be used to implement aspects of the present disclosure. For example, antennas 252, processors 266, 258, 264, and/or controller/processor 280 of the UE 120 and/or antennas 234, processors 220, 230, 238, and/or controller/processor 240 of the BS 110 may be used to perform the various techniques and methods described herein. For example, as shown in FIG. 2, the controller/processor 240 of the BS 110 has an FD-MIMO module 241 that may obtain a relative weight of baseband processing for a CC configured for FD-MIMO communications for the UE 120, determine to enable FD-MIMO downlink transmissions to the UE via the CC based on the relative weight, and direct the TX MIMO processor 230, modulators 232, and antennas 234 in transmitting an FD-MIMO transmission to the UE 110 via the CC, according to aspects described herein. In another example, as shown in FIG. 2, the controller/processor 280 of the UE 120 may have an FD-MIMO module 281 that provides a relative weight of baseband processing for FD-MIMO communications from the BS 110, and directs the receive processor 258, MIMO detector 256, demodulators 254, and antennas 252 in receiving an FD-MIMO transmission, from the BS 120, having a number of spatial layers determined based on the relative weight, according to aspects described herein.

At the BS 110, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120, the antennas 252a-252r may receive the downlink signals from the BS 110 and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at UE 120, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the base station 110. At the BS 110, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The controllers/processors 240 and 280 may direct the operation at the BS 110 and the UE 120, respectively. The controller/processor 240 and/or other processors and modules at the BS 110 may perform or direct the execution of processes for the techniques described herein. The memories 242 and 282 may store data and program codes for BS 110 and UE 120, respectively. A scheduler 244 may schedule UEs for data transmission on the downlink and/or uplink.

Example Full Dimension Multiple-Input
Multiple-Output Baseband Capability Indication Aspects of the present disclosure provide apparatus, methods, processing systems, and computer readable mediums to reduce a quantity of data sent in carrier aggregation (CA) related capability reporting by a UE operating in a cell using full dimension multiple-input multiple-output (FD-MIMO) techniques. In particular, to accurately signal modem capability according to previously known techniques (e.g., LTE Rel-13), the same band combination may be indicated multiple times in a capabilities report (i.e., from a UE) with a different distribution of MIMO capabilities for each band, where the distribution of MIMO capabilities is constrained to satisfy baseband processing limits of the modem of the UE.

According to previously known techniques, a UE may be operating in a cell that uses the band combination 1C(4-4)-3C(4-4), where the number of layers of DL MIMO spatial multiplexing for each CC is indicated in parentheses. If this configuration already consumes all modem baseband processing resources available to the UE, then the UE may not signal FD-MIMO capability for any bands in this band combination, since FD-MIMO modem processing incurs additional costs. The UE may however report FD-MIMO capability if the UE downgrades the DL MIMO capability to support fewer layers of spatial multiplexing, allowing processing resources to be directed to FD-MIMO rather than higher-rank spatial multiplexing. In this example, the UE may report the following band combinations, where FD-MIMO capability for a band is indicated in parentheses:

Downgrade 1C: 1C(2-2-FD)-3C(4-4)
Downgrade 3C: 1C(4-4)-3C(2-2-FD)
Downgrade 1C and 3C: 1C(2-2-FD)-3C(2-2-FD)

It may be noted that none of the band combinations listed above are "fallback band combinations" (as described in previously known techniques), because the band combinations are not derived from 1C(4-4)-3C(4-4) by releasing an SCell (or uplink configuration of an SCell), so different fallback reporting does not reduce the reporting burden.

According to aspects of the present disclosure, a UE may provide modem baseband processing limits in a capability signaled (e.g., to a serving BS) separately from CA capability. In aspects of the present disclosure, a BS may obtain an indication of modem baseband capability limits from a UE; determine, based on the limits, to enable FD-MIMO downlink transmissions to the UE via a component carrier (CC); and transmit an FD-MIMO transmission via the CC to the UE.

In aspects of the present disclosure, a base station (e.g., an eNB) serving a UE may ensure that the below condition is satisfied whenever the BS configures at least one CC to use FD-MIMO:

$$\sum_{i \in configured\ CCs} w_i \cdot (\max DL \text{ layers configured for } CC\ i) \le x \cdot y$$

where:

$$w_i = \begin{cases} x, & \text{if } CC\ i \text{ is configured with FD-MIMO} \\ 1, & \text{otherwise} \end{cases};$$

x=the relative weight of baseband processing by the UE for a CC configured with FD-MIMO compared to baseband processing by the UE for a CC without FD-MIMO and is a parameter provided by the UE; and
y=the maximum number of FD-MIMO layers supported by the UE, summed over all configured CCs.

Of course, if the BS does not configure any CCs with FD-MIMO, then the BS may not apply this rule. The relative weight of baseband processing by the UE for a CC configured with FD-MIMO compared to baseband processing by the UE for a CC without FD-MIMO is a measure of the capacity of the UE to process FD-MIMO transmissions compared to the capacity of the UE to process MIMO transmissions.

According to aspects of the present disclosure, parameters x and y are information elements that specify the FD-MIMO baseband capability of the UE. The UE may include the parameters x and y in a capability reporting message to the BS. The parameter x is the relative weight of baseband processing for a CC configured with FD-MIMO compared to a CC without FD-MIMO. The parameter y is the maximum number of FD-MIMO layers supported by the UE, summed over all configured CCs. For example, a possible 3-bit value range for x might be {1, 1.5, 2, 2.5, 3, 3.5, 4, 4.5}, and a 6-bit value range for y might support up to 256 layers with a resolution of 4 layers, i.e., {4, 8, 12, . . . 256}.

In aspects of the present disclosure, a BS (e.g., an eNB) applying the above rule may reduce max DL layers for one or more CCs in order to enable FD-MIMO, and the CC(s) in which FD-MIMO is enabled may be different than the CC(s) in which max DL layers are reduced.

According to aspects of the present disclosure, variations of the above rule can be constructed if the baseband capability is characterized by additional variables. For example, if processing a CC with higher bandwidth consumes more resources, then the rule may be defined as:

$$\sum_{i \in configured\ CCs} w_i \cdot (\max DL \text{ layers for } CC\ i) \cdot (bw \text{ of } CC\ i) \le x \cdot y$$

where:
  y=a maximum FD-MIMO layer-bandwidth product supported by the UE; and
  bw of CC i=a parameter related to the bandwidth of CC i. bw of CC i may be the actual bandwidth of CC i in kHz or RBs, or may be an indicator indicating the bandwidth of the CC i, e.g., bw=1 when the bandwidth=1.4 MHz, bw=2 when the bandwidth=5 MHz, etc.

In another variation of the above rule, if the UE is not optimized for CCs with small bandwidths, then the rule may be changed to:

$$\sum_{i \in configured\ CCs} w_i \cdot (\max DL\ \text{layers for } CC\ i) \cdot \max(z, bw\ \text{of } CC\ i) \le x \cdot y$$

where:
  z=a carrier bandwidth threshold below which the UE implementation has not been optimized. The UE includes the parameters z in its capability reporting.

In aspects of the present disclosure, a UE may report FD-MIMO relative weights for one or more threshold numbers of layers. That is, a UE may report (e.g., in a capabilities message) a relative weight applicable for any number of DL MIMO layers up to a threshold number of layers. For example, a UE may report a first relative weight for transmissions using up to four DL MIMO layers, a second relative weight for transmissions using five to eight DL MIMO layers, and a third relative weight for transmissions using more than eight DL MIMO layers. In the example, four may be considered a first threshold number of layers, and eight may be considered a second threshold number of layers.

According to another variation of the above rule, if the relative weight x of baseband processing for a CC configured with FD-MIMO depends also on the maximum number of DL MIMO layers of spatial multiplexing, then the rule may be defined as:

$$\sum_{i \in configured\ CCs} w_i \cdot l_i \le y$$

where:

$l_i$ = the maximum number of DL layers configured for $CC\ i$;

and $w_i =$
$\begin{cases} x_0, & \text{if } CC\ i \text{ is configured with FD-MIMO and } l_i \le \text{a first threshold} \\ x_1, & \text{if } CC\ i \text{ is configured with FD-MIMO and } l_i \le \text{a second threshold} \\ x_2, & \text{if } CC\ i \text{ is configured with FD-MIMO and } l_i \le \text{a third threshold} \\ 1, & \text{if } CC\ i \text{ is not configured with FD-MIMO}; \end{cases}$ $x_0$=the relative weight of baseband processing for a CC configured with FD-MIMO and up to a first threshold number (e.g., 2) of spatial multiplexing layers;
  $x_1$=the relative weight of baseband processing for a CC configured with FD-MIMO and up to a second threshold number (e.g., 4) of spatial multiplexing layers;
  $x_2$=the relative weight of baseband processing for a CC configured with FD-MIMO and up to a third threshold number (e.g., 8) of spatial multiplexing layers; and
  y=a maximum value for a weighted sum of DL layers over all configured CCs to the BS and is a parameter provided by the UE.

While the above example describes use of three threshold numbers of spatial multiplexing layers, the present disclosure is not so limited. In aspects of the present disclosure, any number of threshold numbers of spatial multiplexing layers, such that
  $x_n$=the relative weight of baseband processing for a CC configured with FD-MIMO and up to an $n^{th}$ threshold number (e.g., 16) of spatial multiplexing layers.

According to aspects of the present disclosure, reporting of $x_1, x_2, \ldots x_n$ may be optional for a UE, such that if $x_1$ is not reported then $x_1$ is assumed by the BS to be equal to $x_0$; if $x_2$ is not reported then $x_2$ is assumed by the BS to be equal to $x_1$ if $x_1$ is reported and otherwise to be equal to $x_0$. Generalizing, if $x_n$ is not reported then $x_n$ is assumed by the BS to be equal to $x_{n-1}$ if $x_{n-1}$ is reported; if $x_{n-1}$ is not reported then $x_n$ is assumed by the BS to be equal to $x_{n-2}$, and so on down to $x_0$.

According to aspects of the present disclosure, the information element y defines the FD-MIMO baseband processing envelope of the UE. For example, a possible 3-bit value range for each $x_i$ might be $\{1, 1.25, 1.5, 1.75, 2, 2.5, 3, 4\}$, and a 10-bit value for y might support up to 256 layers with a resolution of 1 layer and $x_0=x_1=x_2=4$, because 256 layers with a weighting value of 4 indicates a maximum value of 1024, which can be reported in 10 bits. In another example, a 6-bit value for y might support up to 128 layers with a resolution of 2 layers. In still another example, a 7-bit value for y might support 2 to 128 layers with a resolution of 1 layer.

In aspects of the present disclosure, to reduce the number of bits needed to report the FD-MIMO envelope, the right-hand side of the inequality might be altered as follows:

$$\sum_{i \in configured\ CCs} w_i \cdot l_i \le \max(x_i) \cdot y$$

Thus reducing the number of bits for y from 10 bits, as in the previous example, to 8 bits.

In yet another variation of the above rule, if processing a CC with higher bandwidth consumes more resources, then an appropriate rule may be:

$$\sum_{i \in configured\ CCs} w_i \cdot l_i \cdot \max(z, \text{bandwidth of } CC\ i) \le \max(x_i) \cdot y$$

where:
  $w_i$ depends on the number of layers $l_i$ in the same way described above. At the expense of additional capability signaling, the weight $w_i$ could be further extended to depend on carrier bandwidth.

According to aspects of the present disclosure, if there are no RF restrictions on UE support for FD-MIMO, then reporting of the baseband capability in terms of x and y as described above may be sufficient.

Additionally or alternatively, it may be desirable to limit FD-MIMO capability to particular bands. In that case, a UE may report which bands support FD-MIMO using another information element; or the existing (i.e., according to previously known techniques) per band of band combination (BoBC) reporting of FD-MIMO capability may suffice to convey that band information.

FD-MIMO was introduced in release 13 of the LTE standards, and the feature has been further developed in subsequent releases. The baseband processing requirement for a UE may depend on which release (e.g., Rel-15) is supported by the UE. Each release may have a dedicated set of parameters (e.g., x and y, as described above) to characterize baseband processing capability, or a single set of parameters may be applied to all releases.

According to aspects of the present disclosure, in a multi-mode UE, LTE may operate concurrently with another WWAN technology such as 5G NR. The described concurrent operations may be referred to as E-UTRAN New Radio-Dual Connectivity (EN-DC). In such cases, modem resources may be divided between two or more technologies, such that LTE is allotted only a portion of modem resources. In such cases, a UE may signal a different value of the envelope parameter y to be applied by the eNB. For example, the UE may signal a different value of y for each band combination that is a mixture of LTE and NR bands. The value of y could also be signaled for a particular LTE+NR band combination in response to a capability enquiry from the network.

Current LTE standards support multiple variants of FD-MIMO, including non-precoded channel state information reference signal (CSI-RS), referred to as class A, beamformed CSI-RS, referred to as class B, and hybrid CSI reporting. In aspects of the present disclosure, each variant of FD-MIMO may have a dedicated set of parameters (x, y, . . . ) to characterize the baseband processing capability of the UE for that variant, or a single set of parameters may be applied to all variants.

Current LTE standards support FD-MIMO in different PDSCH transmission modes (i.e., TM9 and TM10). According to aspects of the present disclosure, each transmission mode may have a dedicated set of parameters (x, y, . . . ) to characterize baseband processing capability of the UE for that transmission mode, or a single set of parameters may be applied to all transmission modes.

According to aspects of the present disclosure, the parameters described above (i.e., x, y, . . . ) to indicate the FD-MIMO capabilities of a UE may be signaled to the network by the UE as part of an initial UE capability exchange, or at a later stage in response to an additional UE capability inquiry from the network. For example, a UE may signal (e.g., transmit) to the network one or more information elements (IEs) that may indicate the UE's baseband capability for FD-MIMO. For example, the UE may signal IEs, relWeightTwoLayers-r13, relWeightFourLayers-r13, relWeightEightLayers-r13, or totalWeightedLayers-r13 to specify UE baseband capabilities for FD-MIMO for two layers, four layers, eight layers, and a total capability for any number of layers.

Figure 3:
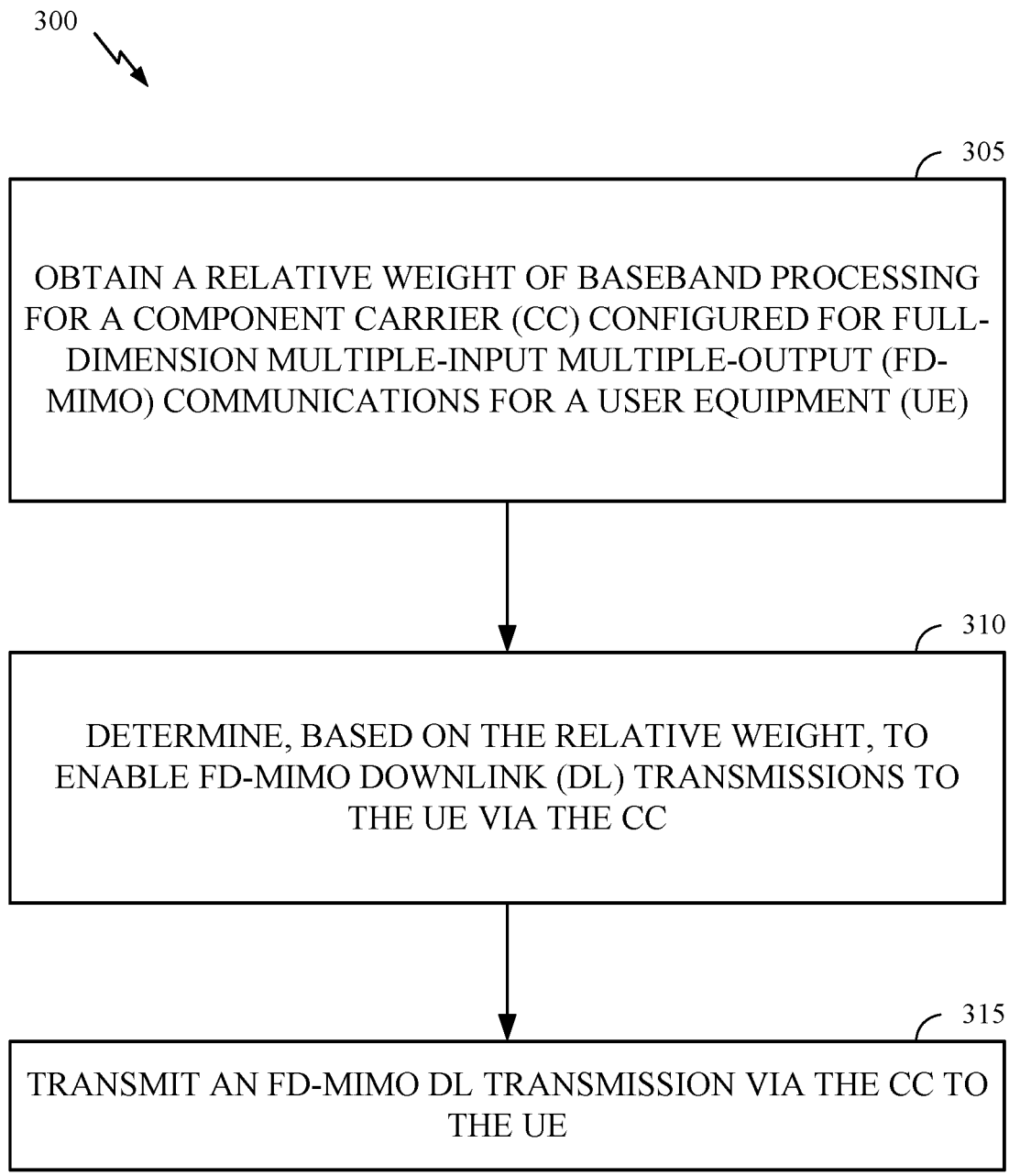
FIG. 3 is a flow diagram illustrating example operations for wireless communication that may be performed by a base station, in accordance with certain aspects of the present disclosure.

FIG. 3 is a flow diagram illustrating example operations 300 for wireless communication, in accordance with certain aspects of the present disclosure. The operations 300 may be performed, for example, by a BS (e.g., such as a BS 110 in the wireless communication network 100, shown in FIG. 1). Operations 300 may be implemented as software components that are executed and run on one or more processors (e.g., controller/processor 240 of FIG. 2). Further, the transmission and reception of signals by the BS in operations 300 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 300 may begin, at block 305, with the BS obtaining a relative weight of baseband processing for a component carrier (CC) configured for full-dimension multiple-input multiple-output (FD-MIMO) communications for a user equipment (UE). For example, BS 110 (shown in FIG. 1) obtains a relative weight (e.g., one of the values in the range {1, 1.25, 1.5, 1.75, 2, 2.5, 3, 4}) of baseband processing for a component carrier configured for FD-MIMO communications for UE 120 (shown in FIG. 1).

Operations 300 continue, at block 310, with the BS determining, based on the relative weight, to enable FD-MIMO downlink (DL) transmissions to the UE via the CC. Continuing the example from above, BS 110 determines, based on the relative weight obtained at block 305, to enable FD-MIMO DL transmissions to the UE 120 via the CC (mentioned in block 305).

At block 315, operations 300 continue with the BS transmitting an FD-MIMO transmission via the CC to the UE. Continuing the example from above, BS 110 transmits an FD-MIMO transmission via the CC (mentioned in block 305) to the UE 120.

According to aspects of the present disclosure, obtaining the relative weight, as described above in block 305, may comprise the BS receiving an indication of the relative weight in a capabilities message from the UE. For example, BS 110 (shown in FIG. 1) may receive a capabilities message from UE 120 (shown in FIG. 1) that includes one or more of the IEs, relWeightTwoLayers-r13, relWeightFourLayers-r13, relWeightEightLayers-r13, and totalWeightedLayers-r13 that indicate the relative weight to enable FD-MIMO DL transmissions to the UE via the CC.

In aspects of the present disclosure, a BS performing operations 300 may determine, based on the relative weight (i.e., the relative weight obtained in block 305), a number of layers of spatial multiplexing for the FD-MIMO DL transmission, and then transmit the FD-MIMO transmission (i.e., the FD-MIMO transmission in block 315) having the determined number of spatial layers. For example, BS 110 (shown in FIG. 1) may obtain a relative weight FD-MIMO DL transmissions to UE 120 (shown in FIG. 1) in block 305 and determine, based on that relative weight, that the BS can transmit a 4-layer transmission to UE 120. Still in the example, the BS 110 then transmits a 4-layer FD-MIMO transmission to UE 120 in block 315.

According to aspects of the present disclosure, a BS performing operations 300 may obtain a maximum number of FD-MIMO layers of spatial multiplexing over all CCs supported by the UE and then determine the number of layers of spatial multiplexing for the FD-MIMO transmission (i.e., the FD-MIMO transmission in block 315) to the UE via the CC further based on the maximum number of FD-MIMO layers. Continuing the previous example, the BS 110 may obtain a maximum number of FD-MIMO layers of spatial multiplexing over all CCs supported by the UE 120 (e.g., a value of totalWeightedLayers-rel13 IE) and then determine the number of layers of spatial multiplexing for the FD-MIMO transmission to the UE to be 2 (instead of 4, as in the previous paragraph) further based on the maximum number of FD-MIMO layers. In the example, the BS 110 then transmits a 2-layer FD-MIMO transmission to UE 120 in block 315.

In aspects of the present disclosure, a BS performing operations 300 may receive an indication of the maximum number of FD-MIMO layers of spatial multiplexing over all CCs supported by the UE in a capabilities message from the UE. For example, BS 110 (shown in FIG. 1) may obtain a maximum number of FD-MIMO layers of spatial multiplexing over all CCs supported by UE 120 (shown in FIG. 1) in a capabilities message from the UE (e.g., by the UE including totalWeightedLayers-rel13 IE in the capabilities message) in block 305 and determine, based on that relative weight, that the BS can transmit a 4-layer transmission to UE 120. Still in the example, the BS 110 then transmits a 4-layer FD-MIMO transmission to UE 120 in block 315.

According to aspects of the present disclosure, a BS performing operations 300 may determine the number of layers of spatial multiplexing for FD-MIMO DL transmissions to the UE via the CC based on a bandwidth of the CC. For example, BS 110 (shown in FIG. 1) may determine the number of layers of spatial multiplexing for FD-MIMO DL transmissions to UE 120 (shown in FIG. 1) via the CC (e.g., a 100 MHz CC) based on a bandwidth (i.e., 100 MHz) of the CC.

In aspects of the present disclosure, a BS performing operations 300 may obtain a threshold bandwidth from the UE and then determine the number of layers of spatial multiplexing for FD-MIMO DL transmissions to the UE via the CC based on the threshold bandwidth when the bandwidth of the CC is less than the threshold bandwidth. For example, BS 110 (shown in FIG. 1) may obtain a threshold bandwidth (e.g., 80 MHz) from UE 120 (shown in FIG. 1) and determine the number of layers of spatial multiplexing for FD-MIMO DL transmissions to the UE via the CC (e.g., a 40 MHz CC) based on the threshold bandwidth (i.e., 80 MHz) when the bandwidth of the CC (i.e., 40 MHz) is less than the threshold bandwidth.

According to aspects of the present disclosure, a BS performing operations 300 may obtain the relative weight (i.e., the relative weight in block 305) by determining the relative weight based on a maximum number of DL layers configured for the CC. For example, BS 110 (shown in FIG. 1) may obtain a threshold bandwidth (e.g., 80 MHz) from UE 120 (shown in FIG. 1) and determine the number of layers of spatial multiplexing for FD-MIMO DL transmissions to the UE via the CC (e.g., a 40 MHz CC) based on the threshold bandwidth (i.e., 80 MHz) when the bandwidth of the CC (i.e., 40 MHz) is less than the threshold bandwidth.

In aspects of the present disclosure, a BS determining the relative weight (i.e., the relative weight in block 305) based on a maximum number of DL layers configured for the CC may determine the relative weight by referring to a relationship, indicated in a transmission from the UE, between a plurality of relative weights and corresponding numbers of DL layers of spatial multiplexing. For example, BS 110 (shown in FIG. 1) determining the relative weight (i.e., the relative weight in block 305) based on a maximum number of DL layers configured for the CC may determine the relative weight by referring to a relationship, indicated in a transmission (e.g., a capabilities message transmission) from the UE (e.g., UE 120, shown in FIG. 1), between a plurality of relative weights and corresponding numbers of DL layers of spatial multiplexing.

According to aspects of the present disclosure, a BS performing operations 300 may receive a maximum value for a weighted sum of DL layers over all configured CCs from the UE and then determine the number of layers of spatial multiplexing for FD-MIMO DL transmissions to the UE based on the weighted sum. For example, BS 110 (shown in FIG. 1) may receive a maximum value for a weighted sum of DL layers over all configured CCs from the UE (e.g., UE 120, shown in FIG. 1) and then determine the number of layers of spatial multiplexing for FD-MIMO DL transmissions to the UE based on the weighted sum.

Figure 4:
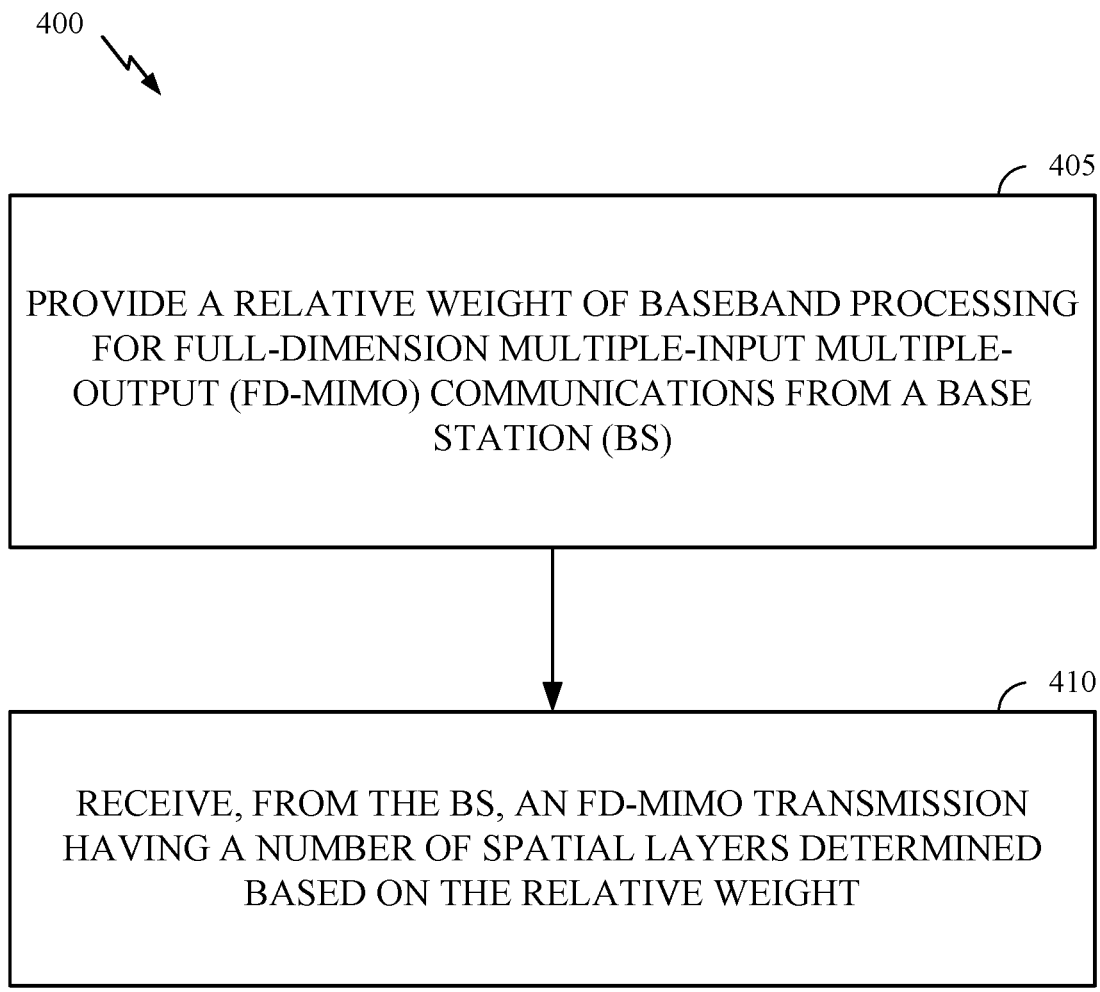
FIG. 4 is a flow diagram illustrating example operations for wireless communication that may be performed by a user equipment, in accordance with certain aspects of the present disclosure.

FIG. 4 is a flow diagram illustrating example operations 400 for wireless communication, in accordance with certain aspects of the present disclosure. The operations 400 may be performed, for example, by a UE (e.g., such as a UE 120 in the wireless communication network 100). The operations 400 may be complementary operations by the UE to the operations 300 performed by a BS. Operations 400 may be implemented as software components that are executed and run on one or more processors (e.g., controller/processor 280 of FIG. 2). Further, the transmission and reception of signals by the UE in operations 400 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 400 may begin, at block 405, with the UE providing a relative weight of baseband processing for full-dimension multiple-input multiple-output (FD-MIMO) communications from a base station (BS). For example, UE 120 (shown in FIG. 1) provides (e.g., by transmitting a capabilities message) a relative weight (e.g., one of the values of a range {1, 1.25, 1.5, 1.75, 2, 2.5, 3, 4}) of baseband processing for full-dimension multiple-input multiple-output (FD-MIMO) communications from a base station (e.g., BS 110, shown in FIG. 1).

Operations 400 continue at block 410 with the UE receiving, from the BS, an FD-MIMO transmission having a number of spatial layers determined based on the relative weight. Continuing the example from above, UE 120 receives from the BS (i.e., the BS mentioned in block 405), an FD-MIMO transmission having a number of spatial layers determined based on the relative weight (i.e., the relative weight the UE provided in block 405).

According to aspects of the present disclosure, a UE performing operations 400 may provide the relative weight (i.e., as described in block 405) by transmitting an indication of the relative weight in a capabilities message. For example, UE 120 (shown in FIG. 1) may transmit the relative weight of baseband processing for full-dimension multiple-input multiple-output (FD-MIMO) communications in a capabilities message.

In aspects of the present disclosure, a UE performing operations 400 may also provide a maximum number of FD-MIMO layers over all CCs supported by the UE to the BS. For example, UE 120 (shown in FIG. 1) may provide a maximum number of FD-MIMO layers over all CCs supported by the UE (e.g., in a totalWeightedLayers-r13 IE) to the BS (e.g., BS 110, shown in FIG. 1).

According to aspects of the present disclosure, a UE performing operations 400 may provide the maximum number of FD-MIMO layers over all CCs supported by the UE (i.e., as described in the previous paragraph) by transmitting an indication of the maximum number of FD-MIMO layers in a capabilities message. Continuing the example from above, the UE 120 may transmit a maximum number of FD-MIMO layers over all CCs supported by the UE to the BS.

In aspects of the present disclosure, a UE performing operations 400 may provide a plurality of relative weights and corresponding numbers of DL layers to the BS. For example, UE 120 (shown in FIG. 1) may provide a plurality of relative weights and corresponding numbers of DL layers to the BS (e.g., by transmitting one or more of the IEs, relWeightTwoLayers-r13, relWeightFourLayers-r13, relWeightEightLayers-r13, and totalWeightedLayers-r13).

According to aspects of the present disclosure, a UE performing operations 400 may provide (e.g. transmit in a capabilities message) a maximum value for a weighted sum of DL layers over all configured CCs to the BS. For example, UE 120 (shown in FIG. 1) may provide, the UE 120 may provide (e.g., in a total WeightedLayers-r13 IE) a maximum value for a weighted sum of DL layers over all configured CCs to the BS.

Figure 5:
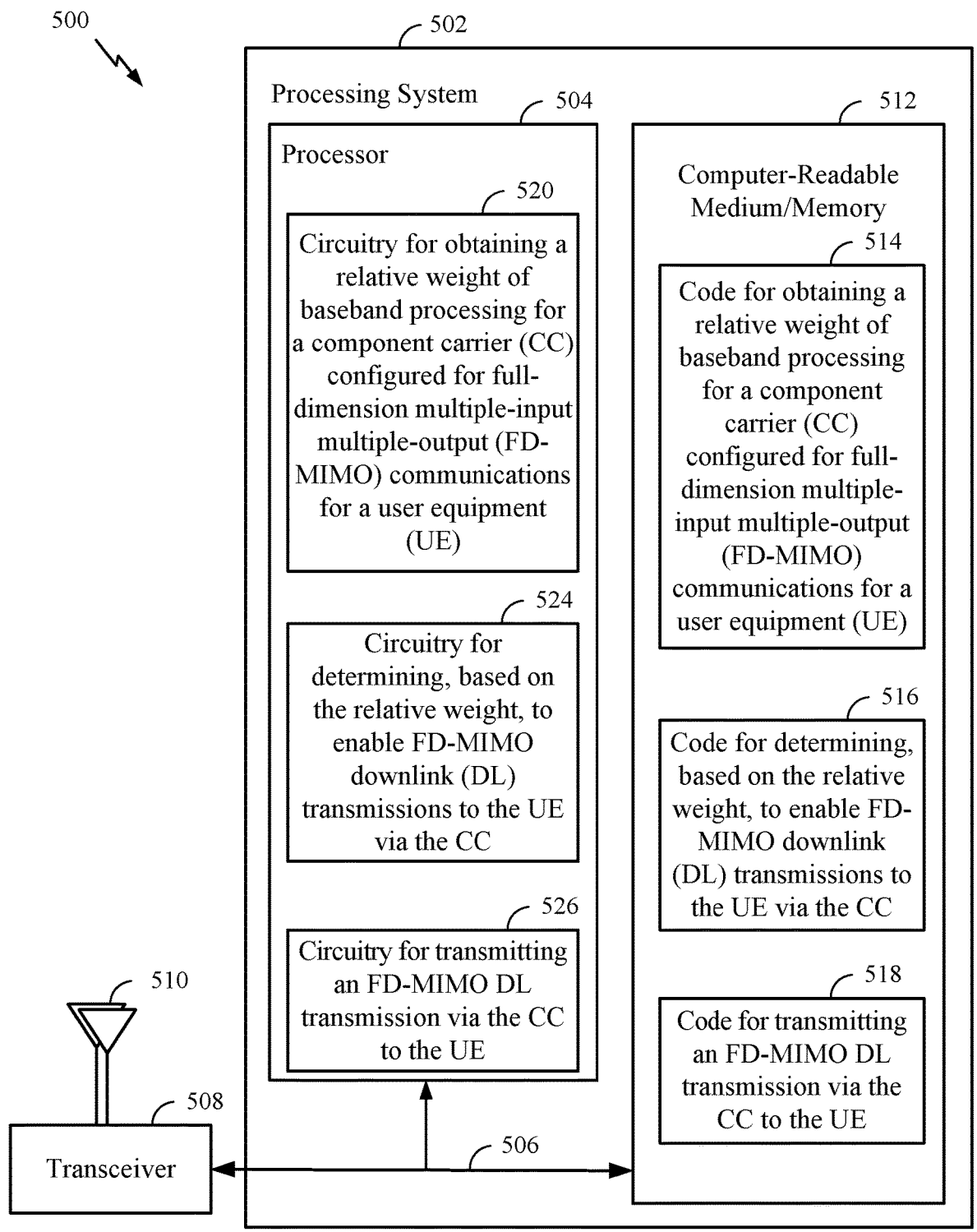
FIG. 5 illustrates a communications device that may include various components configured to perform operations for the techniques disclosed herein in accordance with aspects of the present disclosure.

FIG. 5 illustrates a communications device 500 that may include various components (e.g., corresponding to means-plus-function components) configured to perform operations for the techniques disclosed herein, such as the operations illustrated in FIG. 3. The communications device 500 includes a processing system 502 coupled to a transceiver 508. The transceiver 508 is configured to transmit and receive signals for the communications device 500 via a plurality of antennas 510, such as the various signals as described herein. The processing system 502 may be configured to perform processing functions for the communications device 500, including processing signals received and/or to be transmitted by the communications device 500.

The processing system 502 includes a processor 504 coupled to a computer-readable medium/memory 512 via a bus 506. In certain aspects, the computer-readable medium/memory 512 is configured to store instructions (e.g., computer-executable code) that, when executed by the processor 504, cause the processor 504 to perform the operations illustrated in FIG. 3, or other operations for performing the various techniques discussed herein for performing the various techniques discussed herein. In certain aspects, computer-readable medium/memory 512 stores code 514 for obtaining a relative weight of baseband processing for a component carrier (CC) configured for full-dimension multiple-input multiple-output (FD-MIMO) communications for a user equipment (UE); code 516 for determining, based on the relative weight, to enable FD-MIMO downlink (DL) transmissions to the UE via the CC; and code 518 for transmitting an FD-MIMO transmission via the CC to the UE. In certain aspects, the processor 504 has circuitry configured to implement the code stored in the computer-readable medium/memory 512. The processor 504 includes circuitry 520 for obtaining a relative weight of baseband processing for a component carrier (CC) configured for full-dimension multiple-input multiple-output (FD-MIMO) communications for a user equipment (UE); circuitry 524 for determining, based on the relative weight, to enable FD-MIMO downlink (DL) transmissions to the UE via the CC; and circuitry 526 for transmitting an FD-MIMO transmission via the CC to the UE.

Figure 6:
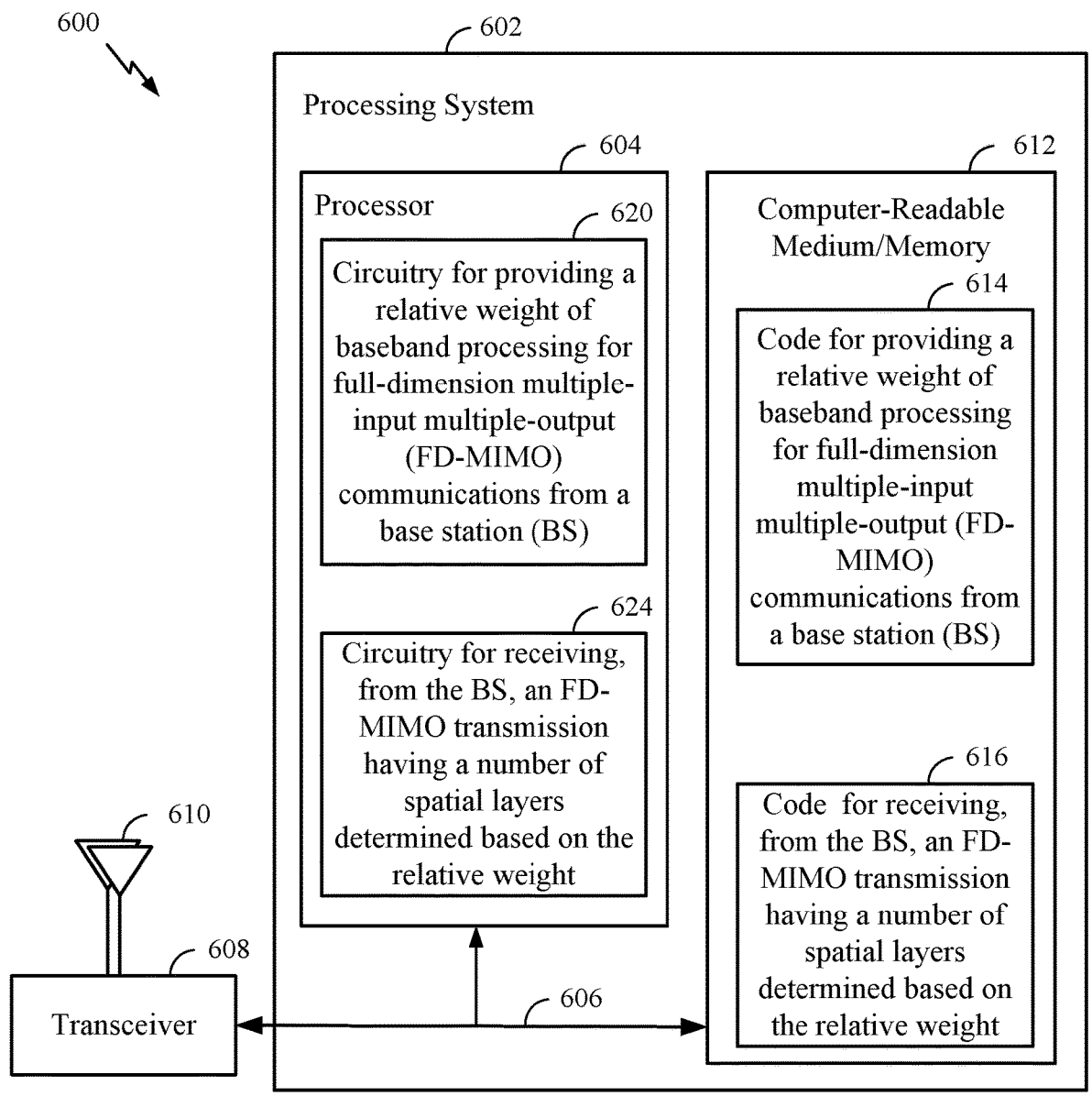
FIG. 6 illustrates a communications device that may include various components configured to perform operations for the techniques disclosed herein in accordance with aspects of the present disclosure.

FIG. 6 illustrates a communications device 600 that may include various components (e.g., corresponding to means-plus-function components) configured to perform operations for the techniques disclosed herein, such as the operations illustrated in FIG. 4. The communications device 600 includes a processing system 602 coupled to a transceiver 608. The transceiver 608 is configured to transmit and receive signals for the communications device 600 via a plurality of antennas 610, such as the various signals as described herein. The processing system 602 may be configured to perform processing functions for the communications device 600, including processing signals received and/or to be transmitted by the communications device 600.

The processing system 602 includes a processor 604 coupled to a computer-readable medium/memory 612 via a bus 606. In certain aspects, the computer-readable medium/memory 612 is configured to store instructions (e.g., computer-executable code) that when executed by the processor 604, cause the processor 604 to perform the operations illustrated in FIG. 4, or other operations for performing the various techniques discussed herein. In certain aspects, computer-readable medium/memory 612 stores code 614 for providing a relative weight of baseband processing for full-dimension multiple-input multiple-output (FD-MIMO) communications from a base station (BS); and code 616 for receiving, from the BS, an FD-MIMO transmission having a number of spatial layers determined based on the relative weight. In certain aspects, the processor 604 has circuitry configured to implement the code stored in the computer-readable medium/memory 612. The processor 604 includes circuitry 620 for providing a relative weight of baseband processing for full-dimension multiple-input multiple-output (FD-MIMO) communications from a base station (BS); and circuitry 624 for receiving, from the BS, an FD-MIMO transmission having a number of spatial layers determined based on the relative weight.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 3-4.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a base station (BS), comprising:
   obtaining a relative weight of baseband processing for a component carrier (CC) configured for full-dimension multiple-input multiple-output (FD-MIMO) communications for a user equipment (UE) compared to baseband processing for a CC without FD-MIMO capabilities;
   determining, based on the relative weight, to enable FD-MIMO downlink (DL) transmissions to the UE via the CC configured for FD-MIMO communications; and
   transmitting an FD-MIMO DL transmission via the CC configured for FD-MIMO communications to the UE.

2. The method of claim 1, wherein obtaining the relative weight comprises receiving an indication of the relative weight in a capabilities message from the UE.

3. The method of claim 1, further comprising:
   determining, based on the relative weight, a number of layers of spatial multiplexing for the FD-MIMO DL transmission, wherein transmitting the FD-MIMO DL transmission comprises transmitting the FD-MIMO DL transmission having the determined number of layers of spatial multiplexing.

4. The method of claim 3, further comprising:
   obtaining a maximum number of FD-MIMO layers over all CCs supported by the UE, wherein determining the number of layers of spatial multiplexing for the FD-MIMO DL transmission to the UE via the CC is further based on the maximum number of FD-MIMO layers.

5. The method of claim 4, wherein obtaining the maximum number of FD-MIMO layers comprises receiving an indication of the maximum number of FD-MIMO layers in a capabilities message from the UE.

6. The method of claim 3, wherein determining the number of layers of spatial multiplexing for the FD-MIMO DL transmission to the UE via the CC is based on a bandwidth of the CC.

7. The method of claim 6, further comprising:
   obtaining a threshold bandwidth from the UE, wherein determining the number of layers of spatial multiplexing for the FD-MIMO DL transmission to the UE via the CC based on the bandwidth of the CC comprises determining the number of layers of spatial multiplexing for the FD-MIMO DL transmission to the UE via the CC based on the threshold bandwidth when the bandwidth of the CC is less than the threshold bandwidth.

8. The method of claim 1, wherein obtaining the relative weight comprises determining the relative weight based on a maximum number of DL layers configured for the CC.

9. The method of claim 8, further comprising:
   receiving a plurality of relative weights from the UE, wherein each relative weight corresponds to a different number of DL layers.

10. The method of claim 1, further comprising:
    receiving a maximum value for a weighted sum of DL layers over all configured CCs from the UE.

11. A method for wireless communications by a user equipment (UE), comprising:
    providing a relative weight of baseband processing for full-dimension multiple-input multiple-output (FD-MIMO) communications from a base station (BS) compared to baseband processing for non-FD-MIMO communications from the BS; and
    receiving, from the BS, an FD-MIMO transmission having a number of spatial layers determined based on the relative weight.

12. The method of claim 11, wherein providing the relative weight comprises transmitting an indication of the relative weight in a capabilities message.

13. The method of claim 11, further comprising:
    providing a maximum number of FD-MIMO layers over all CCs supported by the UE to the BS.

14. The method of claim 13, wherein providing the maximum number of FD-MIMO layers comprises transmitting an indication of the maximum number of FD-MIMO layers in a capabilities message.

15. The method of claim 11, further comprising:
    providing a plurality of relative weights to the BS, wherein each relative weight corresponds to a different number of DL layers.

16. The method of claim 11, further comprising:
    providing a maximum value for a weighted sum of DL layers over all configured CCs to the BS.

17. An apparatus for wireless communications, comprising:
    a processor configured to:
        obtain a relative weight of baseband processing for a component carrier (CC) configured for full-dimension multiple-input multiple-output (FD-MIMO) communications for a user equipment (UE) compared to baseband processing for a CC without FD-MIMO capabilities;
        determine, based on the relative weight, to enable FD-MIMO downlink (DL) transmissions to the UE via the CC configured for FD-MIMO communications; and
        transmit an FD-MIMO DL transmission via the CC configured for FD-MIMO communications to the UE; and
    a memory coupled with the processor.

18. The apparatus of claim 17, wherein the processor is configured to obtain the relative weight by receiving an indication of the relative weight in a capabilities message from the UE.

19. The apparatus of claim 17, wherein the processor is configured to:
    determine, based on the relative weight, a number of layers of spatial multiplexing for the FD-MIMO DL transmission, wherein the processor is configured to transmit the FD-MIMO DL transmission by transmitting the FD-MIMO DL transmission having the determined number of layers of spatial multiplexing.

20. The apparatus of claim 19, wherein the processor is configured to:
obtain a maximum number of FD-MIMO layers over all CCs supported by the UE, wherein the processor is configured to determine the number of layers of spatial multiplexing for the FD-MIMO DL transmission to the UE via the CC further based on the maximum number of FD-MIMO layers.

21. The apparatus of claim 20, wherein the processor is configured to obtain the maximum number of FD-MIMO layers by receiving an indication of the maximum number of FD-MIMO layers in a capabilities message from the UE.

22. The apparatus of claim 19, wherein the processor is configured to determine the number of layers of spatial multiplexing for the FD-MIMO DL transmission to the UE via the CC based on a bandwidth of the CC.

23. The apparatus of claim 17, wherein the processor is configured to obtain the relative weight by determining the relative weight based on a maximum number of DL layers configured for the CC.

24. The apparatus of claim 23, wherein the processor is configured to:
receive a plurality of relative weights from the UE, wherein each relative weight corresponds to a different number of DL layers.

25. The apparatus of claim 17, wherein the processor is configured to:
receive a maximum value for a weighted sum of DL layers over all configured CCs from the UE.

26. An apparatus for wireless communications, comprising:
a processor configured to:
provide a relative weight of baseband processing for full-dimension multiple-input multiple-output (FD-MIMO) communications from a base station (BS) compared to baseband processing for non-FD-MIMO communications from the BS; and
receive, from the BS, an FD-MIMO transmission having a number of spatial layers determined based on the relative weight; and
a memory coupled with the processor.

27. The apparatus of claim 26, wherein the processor is configured to provide the relative weight by transmitting an indication of the relative weight in a capabilities message.

28. The apparatus of claim 26, wherein the processor is configured to:
provide a maximum number of FD-MIMO layers over all CCs supported by the apparatus to the BS.

29. The apparatus of claim 26, wherein the processor is configured to:
provide a plurality of relative weights to the BS, wherein each relative weight corresponds to a different number of DL layers.

30. The apparatus of claim 26, wherein the processor is configured to:
provide a maximum value for a weighted sum of DL layers over all configured CCs to the BS.

* * * * *